United States Patent
Bettenwort et al.

(10) Patent No.: US 8,212,409 B2
(45) Date of Patent: Jul. 3, 2012

(54) METHOD FOR ACTIVATING A MULTI-STRING INVERTER FOR PHOTOVOLTAIC PLANTS

(75) Inventors: Gerd Bettenwort, Kassel (DE); Ralf Juchem, Niestetal (DE); Matthias Victor, Niestetal (DE); Tobias Müller, Escherode (DE)

(73) Assignee: SMA Solar Technology AG, Niestetal (DE)

( * ) Notice: Subject to any disclaimer, the term of this patent is extended or adjusted under 35 U.S.C. 154(b) by 477 days.

(21) Appl. No.: 12/322,916

(22) Filed: Feb. 9, 2009

(65) Prior Publication Data

US 2009/0236917 A1 Sep. 24, 2009

(30) Foreign Application Priority Data

Mar. 22, 2008 (EP) .................................... 08005427

(51) Int. Cl.
*H02J 3/00* (2006.01)
(52) U.S. Cl. ........................................................ 307/82
(58) Field of Classification Search ...................... 307/82
See application file for complete search history.

(56) References Cited

U.S. PATENT DOCUMENTS

| 5,161,097 | A | 11/1992 | Ikeda |
| 5,179,508 | A | 1/1993 | Lange et al. |
| 7,768,244 | B2 | 8/2010 | Perol |
| 7,839,022 | B2 * | 11/2010 | Wolfs .............................. 307/77 |
| 8,102,144 | B2 * | 1/2012 | Capp et al. .................... 320/101 |

FOREIGN PATENT DOCUMENTS

| DE | 199 19 766 | 11/2000 |
| WO | 03/038971 | 5/2003 |

OTHER PUBLICATIONS

Meinhardt M et al: "Multi-String-Converter with reduced specific costs and enhanced functionality", Solar Energy, Pergamon Press. Oxford, GB, Bd. 69, Jul. 1, 2001, pp. 217-227, XP004303022, ISSN: 0038-092X, paragraph 3.1-3.4, illustration 2-4.
Ali Khajehoddin S et al: "A Novel topology and control strategy for maximum power point trackers and multi-string grid-connected PV inverters", Applied Power Electronics Conference and Exposition, 2008. APEC 2008. Twenty-Third Annual IEEE, IEEE, Piscataway, NJ, USA, Feb. 24, 2008, pp. 173-178, XP031253244, ISBN: 978-1-4244-1873-2, pp. 173, p. 174.

* cited by examiner

*Primary Examiner* — Hal Kaplan
(74) *Attorney, Agent, or Firm* — Eschweiler & Associates, LLC

(57) ABSTRACT

A method of activating a Multi-String inverter for photovoltaic generators (1a, 1b) of a photovoltaic plant (6), the Multi-String inverter incorporating on the input side a separate DC-DC converter (2a, 2b) for each generator string (photovoltaic generator) (1a, 1b) and each output of the DC-DC converters (2a, 2b) being connected in parallel and to an input of a DC-AC converter (3) and the DC-AC converter (3) being connected with an alternating current mains (4) for feeding into the mains aims at improving efficiency. This is achieved in that one or several electrical variables, namely input current, input voltage and/or input power are measured at each DC-DC converter (2a, 2b) and at least one of the DC-DC converters (2a, 2b) changing its operating condition as a function of this measurement when a limit value and/or a range is exceeded in such a manner that its power loss is reduced so that the energy yield of the photovoltaic plant (6) is increased.

25 Claims, 5 Drawing Sheets

METHOD FOR ACTIVATING A MULTI-STRING INVERTER FOR PHOTOVOLTAIC PLANTS

CROSS-REFERENCE TO RELATED APPLICATIONS

This application claims Priority from European Application No. DE 08005427.3 filed on 22 Mar. 2008

FIELD OF THE INVENTION

The invention relates to a method for activating a Multi-String inverter for photovoltaic generators of a photovoltaic plant, said Multi-String inverter including for each photovoltaic generator a separate DC-DC converter, and each output of said DC-DC converter being connected in parallel and with an input of a DC-AC converter and said DC-AC converter being connected to an alternating current mains for mains feeding.

Photovoltaic plants of this type consist of several photovoltaic generators or photovoltaic modules for converting the radiation energy into electric energy as well as of an inverter that converts the direct voltage supplied by the photovoltaic modules into an alternating voltage with mains conformity.

Several photovoltaic modules are utilized when the power of one single module is insufficient. When several modules are used, they are connected in series or in parallel to form what are referred to as strings. Since however each module or each string generally yields its maximum power at another voltage, this connection is problematic.

Differing orientation of the modules toward the sun may yield different work points of the modules such as when discrete modules are mounted on different sides of the building or when modules of different sizes are used for reasons of space in the building installation.

Partial shadowing due to passing clouds or the like or due to trees growing in proximity to the plant may also lead to differing work points of the discrete photovoltaic modules.

Different work points are also possible by using different kinds of modules such as crystalline, amorphous or dye solar cells or through production tolerances in the event of modules of the same type.

In case of a series-connection of photovoltaic modules, the module with the lowest current determines the value of the overall current. In case of parallel connection, the module with the lowest voltage determines the overall voltage. As a result, an optimal work point is only possible for one module, only this one module yielding its optimum power, namely the one with the lowest current in case of series connection or that with the lowest voltage in case of parallel connection. This does not allow achieving maximum efficiency of the photovoltaic plant.

DESCRIPTION OF THE PRIOR ART

An inverter is known from DE 199 19 766 A1 wherein one DC-DC converter is connected upstream of each module or of each string. As a result, the same current or voltage values may apply to each output of the DC-DC converters, with the work points of the modules being optimized. The outputs of all the DC-DC converters are connected in parallel and form the input for a DC-AC converter.

Multi-String converters with DC-DC converters are known, which are configured to be boost converters. The DC-AC converters connected downstream thereof may thereby comprise several circuit topologies.

In a first variant, the DC-DC converters are configured to be boost converters, a DC-AC converter in the form of what is referred to as a 3-level bridge being connected downstream thereof. The intermediate circuit voltage thereby aligns on the mains peak voltage and is about 750 V in 230 V mains. The boost converters are constantly activated so that they search for their respective MPP (Maximum Power Point) independent of each other. If the input voltage exceeds the minimum intermediate circuit voltage required, the intermediate circuit voltage is raised as a result thereof. The typical input voltage range for this topology is about 400-900V.

In a second variant, the DC-DC converters are implemented as boost converters and the DC-AC converter connected downstream thereof as an H bridge. The intermediate circuit voltage is also higher than the two input voltages so that both boost converters track their respective MPP independent of each other. In this case as well, the intermediate circuit voltage not only aligns on the mains peak voltage but also on the instantaneous values of the two inputs. The typical input voltage range for this topology is about 150V-600V.

Accordingly, Multi-String inverters with independent inputs offer the advantage that work points at the two inputs may be found individually in case of different generators or radiation situations so that both inputs are respectively working at the maximum power point.

A disadvantage however is that the boost converters are active in any case even if the voltage at the output of the module or of the string is sufficient so that at any time and in any operating condition boost converter losses occur so that the efficiency or the overall energy yield of the plant is not always optimal.

In building installations, it may happen that modules of different sizes or of different types and with very differing output voltages are being utilized for space reasons. A solution is known from DE 101 20 595 B4 wherein, on two modules or strings, the voltage difference of the module with the lower voltage is compensated for by a DC-DC converter implemented as a boost converter. Here also, the two modules can be operated with improved efficiency. The disadvantage is that this solution is only advantageous for two modules and that the boost converter is constantly operated hereby. This means that with this method as well losses occur permanently in the DC-DC converter by actuating the boost converter switch.

The document WO 2007 124 518 A1 shows a circuit arrangement and describes a control method for a photovoltaic inverter with one input. The circuit includes a buck converter for converting the direct voltage of the photovoltaic generator into a direct voltage suited for a bridge circuit for converting the direct voltage into an alternating voltage connected downstream thereof. When the direct voltage of the photovoltaic generator falls below a limit value, the buck converter becomes inactive and a switch, which is parallel to the switch of the buck converter, is closed. An additional switch bypasses the buck converter. This is intended to increase the efficiency of the buck converter or of the inverter. However, the disadvantage of this method is that an additional bypass switch and an additional control unit are needed for this switch. Accordingly, additional components are needed. Moreover, losses also occur in the bypass switch.

BRIEF SUMMARY OF THE INVENTION

It is the object of the invention to indicate a method for controlling an inverter of the type mentioned herein above by means of which the efficiency of the photovoltaic plant is simply improved.

This object is achieved in that one or several electrical variables, namely input current, input voltage and/or input power are measured at each DC-DC converter and that, depending on this measurement, at least one of the DC-DC converters changes its operating condition in such a manner that its power loss is reduced when a limit value is exceeded and/or when the variables of the DC-DC converters lie within a range.

The fact that under certain conditions a low loss operating condition can be set individually for each DC-DC converter makes it possible to increase efficiency.

The invention relies on the idea that, within the control method for the DC-DC converters, additional conditions are defined in which the DC-DC converters of concern of the Multi-String inverter are only active if their activation results in an energetical maximum of the entire plant.

Accordingly, conditions may be set at which the DC-DC converters are to be active or not active. If a DC-DC converter is not active, the work point of the DC side is not set through the DC-DC converter but through the intermediate circuit instead. Then, the generator voltage and the intermediate voltage are equal. The inputs of the DC-DC converters may be treated thereby individually or jointly.

In accordance with the invention, the operating condition of one of the DC-DC converters is changed if a limit value and/or a range is exceeded, depending on a measurement at one of the DC-DC converters at least.

A limit value that may be exceeded is the mains peak voltage. A change in the operating condition occurs for example if a first generator voltage is sufficiently higher than the mains peak voltage and also sufficiently higher than a second generator voltage. The first DC-DC converter may then be deactivated so that its work point is set via the intermediate circuit voltage. The second DC-DC converter then remains active, though. Deactivation of the first DC-DC converter affords savings in the losses thereof so that the efficiency of the entire circuit arrangement of the string inverter is increased.

Variables of the DC-DC converters lie within a range if input voltages of the DC-DC converters lie within a voltage band or a voltage range. The operating condition may for example change when the two input voltages of the DC-DC converters, i.e., the two generator voltages, are within a narrow voltage band for a defined time in spite of individual work point setting and when their absolute value is higher than the mains peak voltage. In this case, it is even possible to deactivate the two DC-DC converters so that the work points of the two inputs of the DC-DC converters are set in parallel via the intermediate circuit voltage. In this case, individual setting of a photovoltaic module or string is not provided for. Since the losses in the DC-DC converters are further minimized in spite of a possible non optimal work point for the individual strings, one obtains an energetical maximum for the overall apparatus so that its efficiency is improved. When the ambient conditions for the inputs of the DC-DC converters change again, i.e., for example when a generator delivers increased power, the DC-DC converters are set individually. This may be inferred from the change in the power ratio between the two strings. Then, the two DC-DC converters are activated again.

In accordance with the invention, the electrical input variables current, voltage and/or power of the DC-DC converters are measured and the operating conditions of the Multi-String inverter are adapted as a function of defined enabling criteria.

A change in the ratio of at least one of the electrical input variables of at least two DC-DC converters is evaluated as an enabling criterion.

The DC-DC converter as well as the DC-AC converter can be integrated in one housing but may also be implemented separately.

Other advantageous implementations of the invention are characterized in the dependent claims.

In an advantageous developed implementation of the method of the invention there is provided that the operating condition of at least one of the DC-DC converters is changed by the fact that one switch element of the DC-DC converter is not activated permanently and is switched off or on in such a manner that its input voltage substantially corresponds to its output voltage. As a result, there are no switch losses in the semiconductor switch itself, which increases the efficiency of the entire plant.

A particular effect of benefit is obtained if at least one of the DC-DC converters to which the highest input voltage applies is switched off, said voltage being higher than a mains peak voltage. The work point of the photovoltaic module connected to this DC-DC converter may then be set via the intermediate circuit voltage. In the switched-off condition, the input voltage of the DC-DC converter approximately corresponds to its output voltage.

It is advantageous that at least two DC-DC converters are switched off when both input voltages of the DC-DC converters are within a narrow voltage range. If both generator voltages are within a narrow voltage band for a defined time in spite of individual work point setting, both DC-DC converters can be switched off, this considerably reducing the losses. The work points of the two photovoltaic generators can be optimized through the DC-AC converter. Practically, this occurs when the input voltage applying to the two DC-DC converters is higher than the mains peak voltage.

In another preferred implementation of the invention, there is provided that at least one of the DC-DC converters is re-activated when the input voltage of the DC-Ac converter drops in the range of the mains peak voltage, when a power ratio of the photovoltaic generators changes above a limit value and/or when a defined time has past. This reactivation ensures that the work points of the photovoltaic generators may be adapted individually.

Another effect of benefit is obtained when a Maximum Power Tracking having a shadowing detection for the photovoltaic generators is utilized so that the most advantageous work point is set in the event of several power peaks. The adapted operating conditions make it possible to detect shadowed photovoltaic generators and to influence the Maximum Power Tracking in such a manner as a result thereof that an energetically more advantageous work point is adopted. This is for example possible by increasing the search range of the Maximum Power Tracking over usual search ranges.

In a development of the method of the invention, one switches between several Maximum Power Tracking methods. Meaning one may switch from a first Maximum Power Tracking method to a second Maximum Power Tracking method when certain operating conditions of the DC-DC converters occur or when one of these DC-DC converters is not permanently activated. This allows to further improve efficiency.

Another preferred implementation of the invention is characterized in that each DC-DC converter is configured to be a boost converter. This is advantageous since there are hardly any losses when the switches are deactivated, meaning when the semiconductor switch of the boost converter is simply no longer activated, i.e., no longer closed. Electrical connection between the positive pole and the negative pole of the photovoltaic generator and the intermediate circuit is then established via a choke and a diode of the boost converter.

Improved efficiency of the photovoltaic plant is achieved by switching on an additional switch for bridging a semiconductor switching element, a diode and/or a choke in an inactive condition of operation of at least one of the DC-DC converters.

A series connection of a choke and a diode, in particular of a boost converter, can be bridged through this additional switch. For this variant, an additional switch with a corresponding activation is needed. Then, there are no longer losses in the choke and in the diode of the boost converter but only in the additional switch. These losses may however be considerably lower or even negligible. The additional switch may be a mechanical switch, a semiconductor switch or a diode with a small flow voltage. Other DC-DC converter types may also be utilized with the additional switch for bridging DC-DC converter components. Then, the semiconductor switch of the corresponding DC-DC converter is no longer pulsed, components, in particular a choke and/or a diode, being bridged by the additional switch. As a result, the DC-DC converters may be configured to be boost converters, buck converters or what are referred to as Sepic or Zeta converters, the desired efficiency improvement being achieved.

A relay or a comparable mechanical switch which bridges, almost without loss, the corresponding components may also be utilized as an additional switch. A mechanical switch is possible as a result thereof, since changes in the generator voltages due to shadowing or the like occur quite slowly. A suited semiconductor switch such as a MOSFET switch is however also possible.

An exemplary embodiment will be discussed in closer detail with reference to the drawings, other advantageous developed implementations of the invention and advantages thereof being described.

In said drawings:

DETAILED DESCRIPTION OF THE INVENTION

Figure 1:
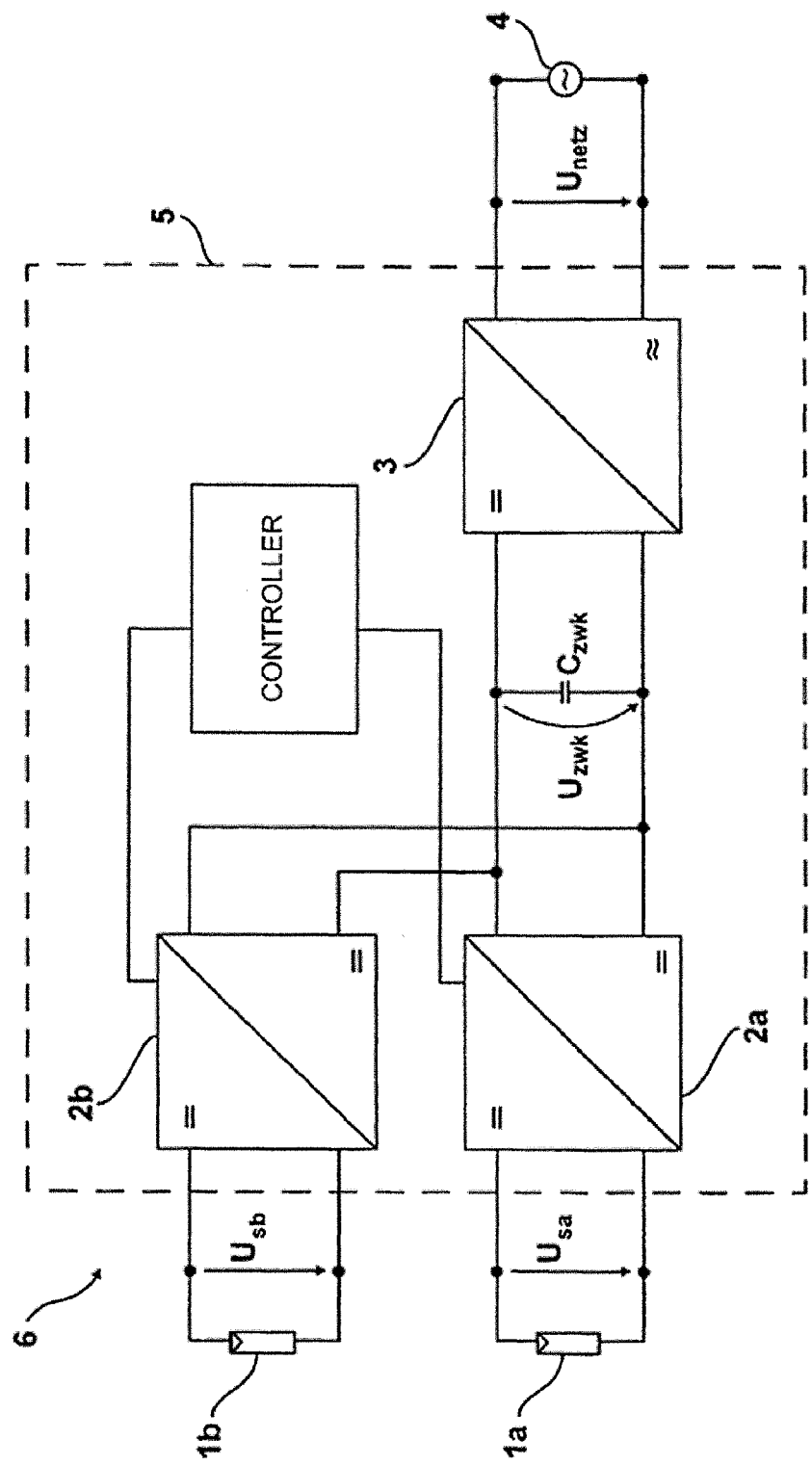
FIG. 1 shows a schematic diagram of a circuit arrangement of a photovoltaic plant with a Multi-String inverter with two independent inputs.

FIG. 1 illustrates a circuit arrangement of a photovoltaic plant 6. This plant incorporates a Multi-String inverter with two independent inputs. The photovoltaic plant 6 is provided with two photovoltaic generators 1a, 1b by way of example.

The photovoltaic generators 1a, 1b may be composed of one or several photovoltaic modules connected in series, in parallel or in strings. A DC-DC converter 2a, 2b is connected downstream of each of these photovoltaic generators 1a, 1b so that the photovoltaic generator 1a is associated with the DC-DC converter 2a and that the photovoltaic generator 1b is associated with the DC-DC converter 2b. The photovoltaic generators 1a, 1b supply the voltages Usa and Usb. The outputs of the DC-DC converters 2a, 2b are connected in parallel so that there is only one unique intermediate circuit voltage Uzwk. An intermediate circuit capacitor Czwk fed by the DC-DC converters 2a, 2b is mounted in parallel with the outputs of the DC-DC converters 2a, 2b. A DC-AC converter 3 delivering a mains peak voltage Unetz at the output and connected to a mains 4 is mounted downstream of the intermediate capacitor Czwk.

The DC-AC converter 3 is provided with a bridge circuit and can contain on its output side a line filter that has not been illustrated herein. The function of the DC-AC converter 3 is to provide on the output side a line conforming alternating voltage of for example 110 volt or of 230 volt and of 50 Hz or 60 Hz for feeding this alternating voltage into the mains 4. This mains 4 can be the utility grid or an isolated mains. The two DC-DC converters 2a and 2b, the intermediate circuit capacitor Czwk and the DC-AC converter 3 can be integrated in a housing of a Multi-String apparatus 5. A separate implementation is also possible, though.

The photovoltaic plant 6 shown in FIG. 1 only contains two strings and, as a result thereof, only two DC-DC converters 2a, 2b. However, more than two strings, and as a result thereof, more than two DC-DC converters may be provided.

Figure 2:
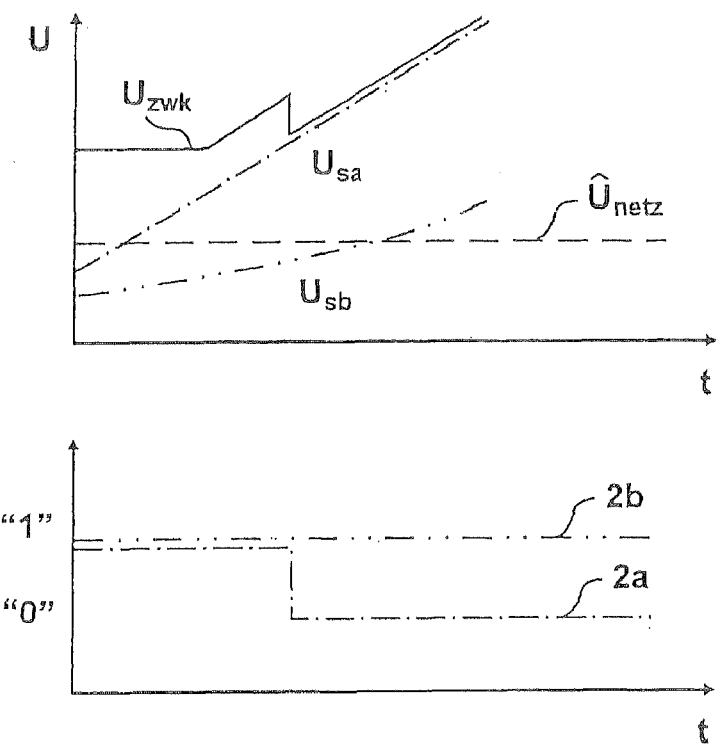
FIG. 2 shows an illustration of voltage curves at the output of photovoltaic generators, of an intermediate circuit as well as the associated peak values of a mains peak voltage as a function of time.
Figure 3:
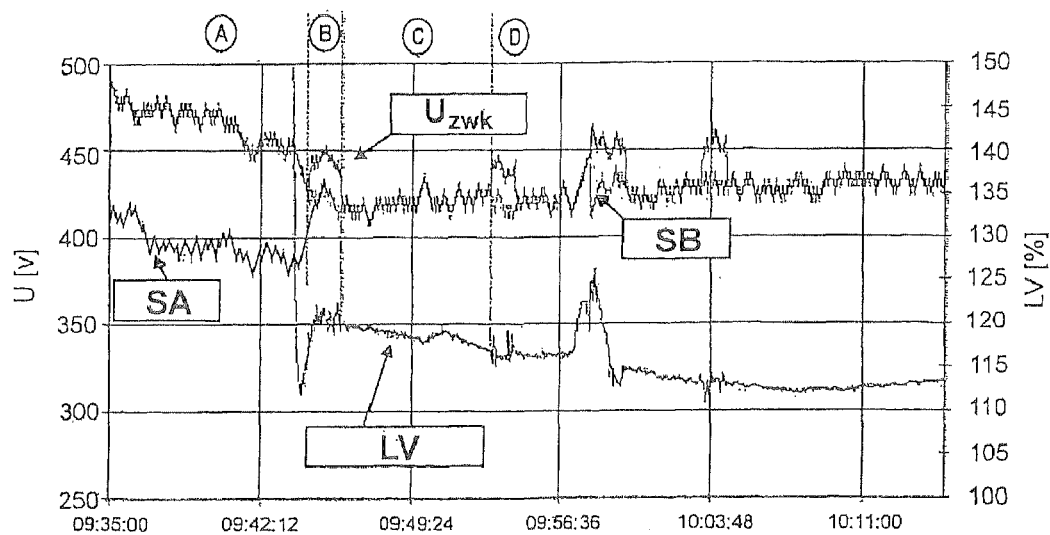
FIG. 3 shows an illustration of voltage curves at the output of photovoltaic generators, the voltage of the intermediate circuit as a function of time t for the circuit arrangement shown in FIG. 1 as well as a curve of the power ratio between the discrete strings.

FIG. 2 and FIG. 3 show possible schematic voltage curves for the circuit arrangement shown in FIG. 1. In FIG. 1, the taps of the voltages Usa, Usb shown in FIG. 2 and in FIG. 3 are shown. Both serve to garner a better understanding of the method for adding and removing DC-DC converters 2a, 2b from the circuit and to describe the enabling conditions.

FIG. 2 shows possible curves of the voltages Usa and Usb at the photovoltaic generators 1a and 1b, the resulting intermediate voltage Uzwk as well as the peak value Ûnetz of the line voltage Unetz. If, as shown in FIG. 2, the generator voltage Usa for example is both sufficiently higher than the mains peak voltage Ûnetz and sufficiently higher than the second generator voltage Usb, the associated DC-DC converter 2a can be deactivated. As a result, the DC work point is set via the intermediate circuit voltage Uzwk, i.e., the generator voltage Usa and the intermediate circuit voltage Uzwk are equal. The work point of the second input, i.e., of the photovoltaic generator 1b, is set via its active DC-DC converter 2b. This affords savings in the losses of the DC-DC converter 2a. As a result, the efficiency of the entire plant increases significantly. In FIG. 2, the activated condition is indicated at "1" and the deactivated condition at "0".

FIG. 3 shows possible voltage curves at the output of the photovoltaic generators 1a, 1b or strings SA, SB of the intermediate circuit for the circuit arrangement shown in FIG. 1 as well as the curve of the power ratio LV between the strings or the photovoltaic generators 1a, 1b. One may distinguish between four areas A through D that are following one another in time.

In the area A, the two photovoltaic generator voltages Usa and Usb lie above the mains peak voltage Ûnetz of for example 325 V and are spaced significantly apart. The mains peak voltage Ûnetz is not shown in FIG. 3. In this condition, the DC-DC converter 2a is active. The second DC-DC converter 2b is deactivated and the work point of the generator 1b or of the strings is set via the intermediate circuit. At the end of area A, the two photovoltaic voltages approach each other.

Therefore, the DC-DC converter 2b of the second generator 1b is switched on in area B so that the two strings may set their individual work points. The intermediate voltage Uzwk is higher than the higher photovoltaic voltage.

At the end of area B, the two photovoltaic voltages lie within a defined voltage range for a defined time.

In area C, both DC-DC converters 2a, 2b are therefore switched off and the work points are set jointly via the intermediate circuit.

In area D, the power ratio between the two inputs has significantly changed so that both DC-DC converters 2a, 2b become active again and individually set the work points.

In spite of the individual work point, which is not always optimal for the generators 1a or 1b in the course of time, one obtains an energetical maximum for the entire apparatus by virtue of the savings made in the DC-DC converter losses. If the ambient conditions for the two inputs change in the meanwhile and if individual treatment is needed, this may for example be inferred from the change in the power ratio between the two generators 1a, 1b and the DC-DC converters 2a, 2b are activated again.

Figure 4A:
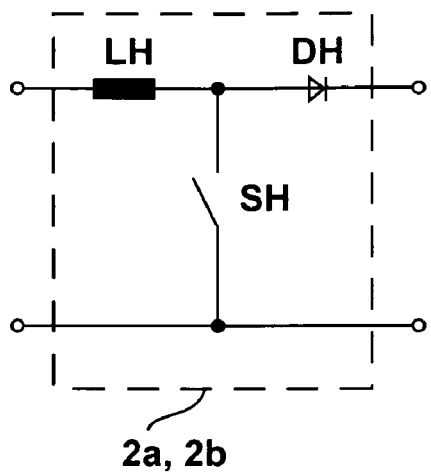
FIG. 4a shows a DC-DC converter for use in the Multi-String inverter which is configured to be a boost converter.

The DC-DC converters 2a, 2b shown in FIG. 1 are preferably configured to be boost converters. A preferred circuit arrangement of the boost converters is shown in FIG. 4a. The boost converter consists of a choke LH and of a diode DH connected in series; the anode of the diode is connected to the choke LH. At the link point between the two components, there is connected a semiconductor switch SH that is connected to the negative pole. By pulsing the semiconductor switch SH, the output voltage or the output current of the boost converter may be changed.

If the boost converter is not active, the switch SH remains open. The positive pole of the photovoltaic generator connected to the input side is connected to an intermediate capacitor Czwk not shown herein via the choke LH and the diode DH.

Figure 4B:
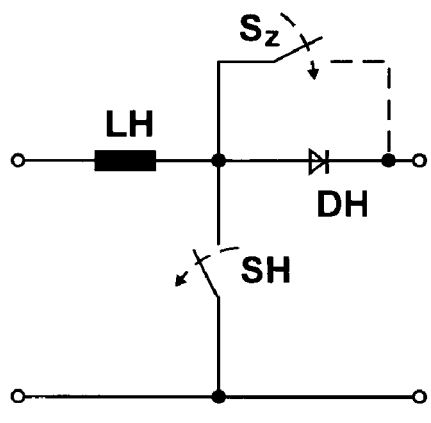
FIG. 4b shows a first variant of the DC-DC converter for use in the Multi-String inverter, which is configured to be a boost converter and is provided with an additional switch for bridging a diode.

FIG. 4b shows a variant of the circuit arrangement of the boost converter for the DC-DC converters 2a or 2b with an additional switch Sz for bridging the diode DH.

Figure 4C:
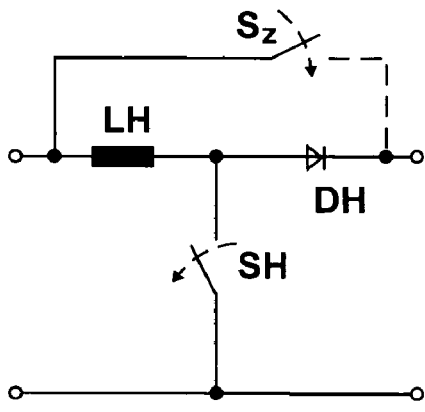
FIG. 4c shows a second variant of the DC-DC converter for use in the Multi-String inverter, which is configured to be a boost converter and is provided with an additional switch for bridging the diode and a choke.

The switch Sz can also bridge the series connection consisting of the choke LH and the diode DH as illustrated in FIG. 4c.

Two operating conditions are possible in the circuits as shown in FIG. 4b or in FIG. 4c.

In the first operating condition, the semiconductor switch is pulsed or activated, the bridging switch Sz being open.

In the second operating condition, the semiconductor switch is not pulsed or activated, but remains open, the bridging switch Sz being closed.

A measurement device that has not been shown measures electrical variables such as the output voltages Usa, Usb of the generators 1a and 1b and their currents. A control unit controls the switches SH and Sz as a function of the measured variables and of defined limit values or ranges.

Figure 5A:
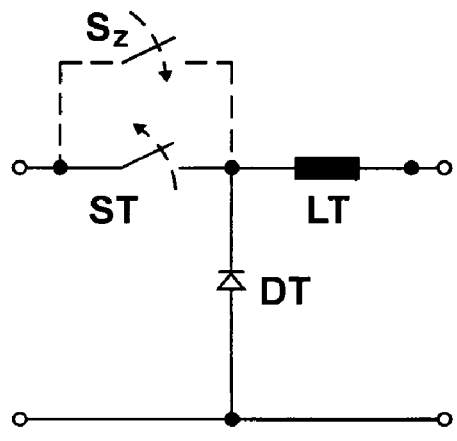
FIG. 5a shows a DC-DC converter for use in the Multi-String inverter, which is configured to be a buck converter and is provided with an additional switch for bridging the diode and a choke.

FIG. 5a shows a DC-DC converter 2a or 2b that is configured to be a buck converter. A semiconductor switch ST and a choke LT are connected in series. At the point of linkage of the two components, there is connected a diode DT the anode of which is connected to the negative pole.

If the buck converter is inactive, its semiconductor switch ST is open. An additional switch Sz, which is connected in parallel to the semiconductor switch ST, is then closed and serves to bridge the buck converter switch ST.

Figure 5B:
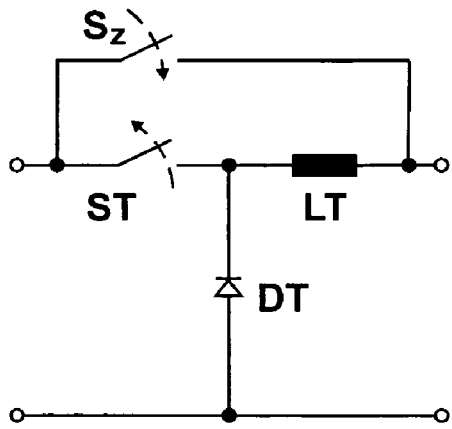
FIG. 5b shows a variant of the DC-DC converter, which is configured to be a buck converter and is provided with an additional switch for bridging the semiconductor switch and a choke.

If the choke LT is also to be bridged, the additional switch Sz is connected in parallel with the semiconductor switch ST and the choke LT, which is shown in FIG. 5b.

Figure 6:
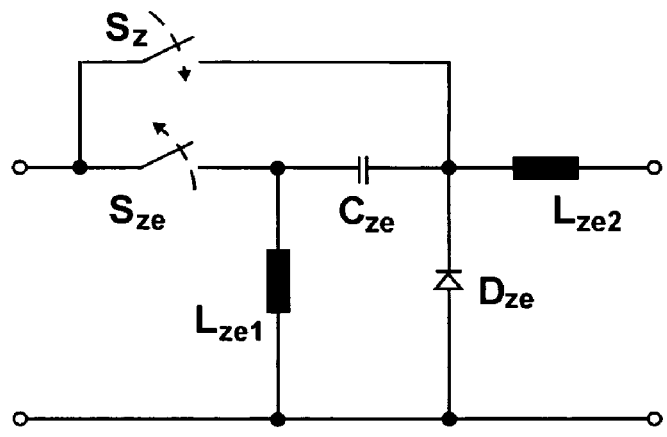
FIG. 6 shows a variant of the DC-DC converter, which is configured to be a Zeta converter and is provided with an additional switch for bridging a semiconductor switch and a capacitor.

FIG. 6 shows a DC-DC converter 2a, 2b that is configured to be a Zeta converter. Said Zeta converter consists of a series connection consisting of a semiconductor switch Sze, a capacitor Cze and a choke Lze2. At the link point between Sze and Cze, there is connected a choke Lze1 that is also connected to the negative pole. At the link point between Cze and Lze a diode Dze the anode of which is connected to the negative pole is connected to the cathode.

For this converter, an additional switch Sz for bridging components is also necessary. If the Zeta converter is not active, the switch Sze is open. The additional switch Sz is closed in this case and then bridges at least the switch Sze as well as the capacitor Cze. In principle, the bridge may also be extended to the choke Lze2.

Figure 7:
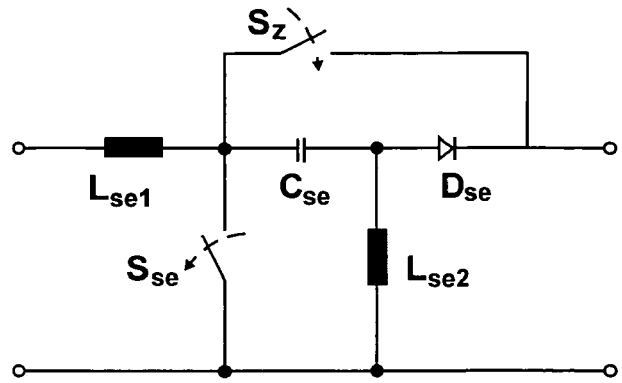
FIG. 7 shows a variant of the DC-DC converter, which is configured to be a Sepic converter and is provided with an additional switch for bridging a diode and a capacitor

FIG. 7 illustrates an example in which each DC-DC converter 2a, 2b is configured to be a Sepic converter. The Sepic converter incorporates a choke Lse1, a capacitor Cse and a diode Dse, which are connected in series. The semiconductor switch Sse lies between the link point between the choke Lse1 and the capacitor Cse and the negative pole. Another choke Lse2 is connected between the link point of the anode of the diode Dse and of the capacitor Cse and the negative pole.

The Sepic converter is provided with an additional switch Sz for bridging components. When closed, it bridges in particular the capacitor Cse and the diode Dse. When the Sepic converter reaches an operating condition in which the semiconductor switch Sse is not permanently activated, the additional switch Sz is closed so that a current can flow through the first choke Lse1 and the switch Sz into the DC-AC converter 3. It is also possible that the additional switch Sz additionally bridges the first choke Lse1.

In the inactive operating condition, the semiconductor switch Sse is open. This means that the semiconductor switch Sse is not permanently activated. In the active operating condition, the semiconductor switch Sse is pulsed in such a manner that a maximum power is individually set for the corresponding DC-DC converter.

Accordingly, this variant is characterized in that all the DC-DC converters are configured to be Sepic converters and that an additional switch Sz for bridging the Sepic converter capacitance and the Sepic converter diode Dse is closed for each inactive Sepic converter.

In an alternative, this variant is characterized in that all the DC-DC converters are configured to be Sepic converters and that an additional switch Sz for bridging the Sepic converter capacitance and the Sepic converter diode Dse and the Sepic converter choke Lse1 is closed for each inactive Sepic converter.

Figure 8:
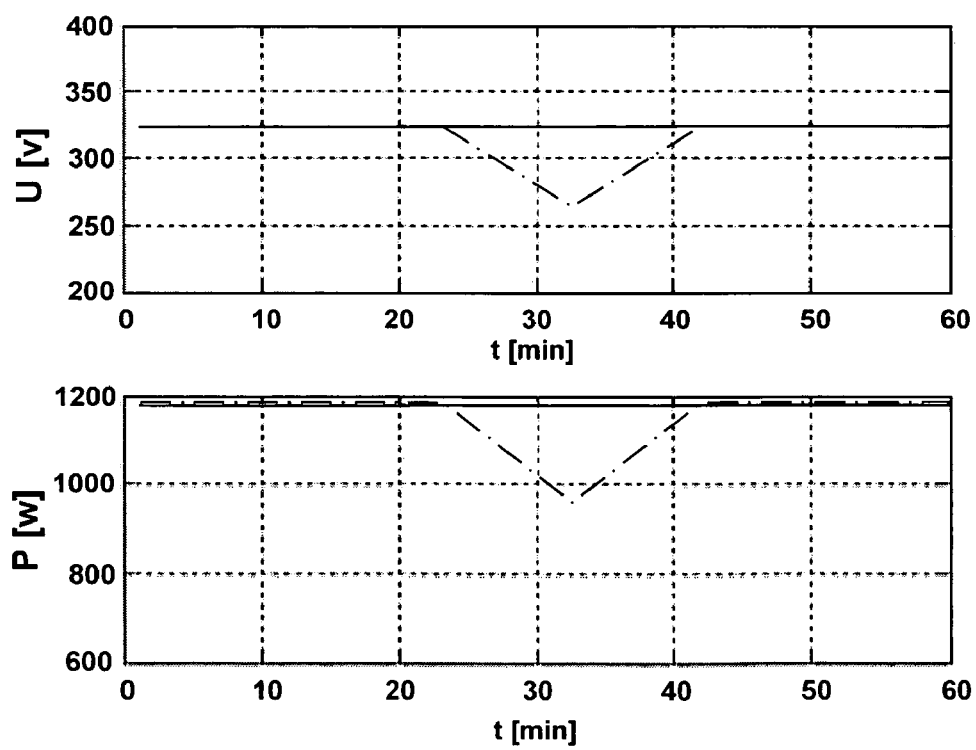
FIG. 8 shows a voltage and a power curve at the inputs of the DC-DC converter.

FIG. 8 illustrates a time curve of the voltages Usa, Usb or of the power Psa, Psb at the inputs of the DC-DC converters 2a, 2b as it may occur in a circuit arrangement as shown in FIG. 1. The continuous lines indicate the measured variables of a non-shadowed photovoltaic generator. The dash-dot lines indicate the other generator string, which is shadowed at times.

In the first 20 minutes of the time window observed, the two voltages Usa, Usb of the two inputs have the same curve. After about 20 minutes, a shadow forms on one photovoltaic generator 1a or 1b. This shadow causes the powers of the generators to differ and this is detected as a shadow since the value is no longer within a fixed tolerance band of the power ratios of the photovoltaic generators 1a and 1b.

If identical photovoltaic modules 1a and 1b are utilized as far as possible, this offers the advantage that the DC-DC converters are only active or that only one of the DC-DC converters is only active if the shadow on the modules differs. As a result, efficiency can be considerably improved. An MPP point of the photovoltaic generators 1a, 1b can then be set via the DC-AC converter 3 in the case of inactive DC-DC converters 2 a, 2 b.

In order to achieve an optimal work point of the plant, the DC-AC converter 3 performs an MPP method. Preferably, it sets always the higher work point at several power maxima. Several maxima may occur when partial shadowing of the photovoltaic generators 1a, 1b occurs.

An operating condition in the sense of the invention is given when:
- a semiconductor switch of the corresponding DC-DC converter 2a, 2b is pulsed or
- the semiconductor switch is permanently not pulsed and permanently open or
- a semiconductor switch of the corresponding DC-DC converter 2a, 2b is not pulsed and permanently closed or
- an additional bypass switch is permanently open or permanently closed.

Combinations of these operating conditions are also possible.

LIST OF NUMERALS 1A, 1B PHOTOVOLTAIC GENERATORS
2a, 2b DC-DC converter
3 DC-AC converter
4 mains
5 Multi-String apparatus
6 photovoltaic plant
Czwk intermediate circuit capacitor
SA, SB strings
LV power ratio
LH, LT choke
DH, DT diode
SH, ST semiconductor switch
Cze Zeta converter capacitor
Cse Sepic converter capacitor
Lze1 first Zeta converter choke
Lze2 second Zeta converter choke
Lse1 first Sepic converter choke
Lse2 second Sepic converter choke
Dze Zeta converter diode
Dse Sepic converter diode
Sze Zeta converter semiconductor switch
Sse Sepic converter semiconductor switch
Sz additional switch

The invention claimed is:

1. A method of controlling a Multi-String inverter for a plurality of photovoltaic generator strings of a photovoltaic plant, said Multi-String inverter incorporating one separate DC-DC converter for each photovoltaic generator string on its input side, each output of said DC-DC converters being connected in parallel and with an input of a DC-AC converter and said DC-AC converter being configured to be connected to an alternating current mains for feeding into the mains, comprising:
measuring an input current, input voltage and/or input power at each DC-DC converter, thereby generating measured input parameters; and
changing an operating condition of at least one of the DC-DC converters based upon a comparison of the measured input parameters of at least two of the DC-DC converters.

2. The method as set forth in claim 1, wherein changing the operating condition of at least one of the DC-DC converters comprises altering a switching of a switch element of the at least one DC-DC converter in such a manner that its input voltage corresponds to its output voltage.

3. The method as set forth in claim 2, wherein changing the operating condition of at least one of the DC-DC converters occurs when the at least one DC-DC converter has a highest input voltage of all the DC-DC converters and when the input voltage thereof is above a mains peak voltage.

4. The method as set forth in claim 2, wherein changing the operating condition of at least one DC-DC converter comprises deactivating at least two DC-DC converters when two input voltages of the at least two DC-DC converters lie within a predetermined voltage range.

5. The method as set forth in claim 2, wherein changing the operating condition of at least one DC-DC converter comprises deactivating at least two DC-DC converters when input voltages at the at least two DC-DC converters are both above a mains peak voltage.

6. The method as set forth in claim 4, further comprising activating the at least one of the DC-DC converters when the input voltage of the at least one DC-DC converter differs by less than a predetermined amount from a mains peak voltage, when a power ratio of the photovoltaic generator strings of the at least two DC-DC converters is above a limit value and/or when a defined time has passed after the at least one DC-DC converter has been deactivated.

7. The method as set forth in claim 1, further comprising detecting partial shadowing of the photovoltaic generators as a function of operating conditions of at least two of the plurality of DC-DC converters.

8. The method as set forth in claim 1, further comprising closing, in an inactive operating condition of a respective DC-DC converter, an additional switch for bridging a semiconductor switch, a diode and/or a choke in in the respective DC-DC converter.

9. The method as set forth in claim 1, wherein each DC-DC converter is configured as a boost converter.

10. An inverter, comprising:
a plurality of DC-DC converters, each of the DC-DC converters comprising a pair of input terminals configured to couple to a photovoltaic module, and a pair of output terminals coupled together in parallel to form a single pair of DC-DC converter output terminals;
a DC-AC converter having a pair of input terminals coupled to the single pair of DC-DC converter output terminals, and having a pair of output terminals configured to couple to a grid; and a controller configured to selectively control one or more of the DC-DC converters based on input voltages at the input terminals of at least two of the DC-DC converters and a grid voltage at the output terminals of the DC-AC converter.

11. The inverter of claim 10, wherein the controller selectively controls one or more of the DC-DC converters by altering an operating condition of the one or more DC-DC converters.

12. The inverter of claim 11, wherein altering the operating condition comprises deactivating the one or more DC-DC converters, wherein a voltage at the single pair of DC-DC converter output terminals and a voltage at the input terminals of the one or more DC-DC converters are the same.

13. The inverter of claim 10, wherein the controller is configured to deactivate one of the plurality of DC-DC converters if a voltage at the input terminals thereof is greater than a voltage at the input terminals of another of the plurality of DC-DC converters, and the voltage at the input terminals is greater than a peak grid voltage at the output terminals of the DC-AC converter.

14. The inverter of claim 13, wherein a deactivation of the one of the DC-DC converters comprises controlling an operating condition thereof so that a voltage at the single pair of DC-DC converter output terminals and a voltage at the input terminals of the one of the DC-DC converters are the same.

15. The inverter of claim 10, wherein the controller is configured to deactivate two of the plurality of DC-DC converters if the two DC-DC converters each have an input voltage at the respective input terminals that is greater than a peak grid voltage at the output terminals of the DC-AC converter, and if a difference between the voltages at the input terminals of the two converters is less than a predetermined threshold for a predefined period of time.

16. The inverter of claim 15, wherein a deactivation of the two DC-DC converters means controlling an operating condition thereof so that a voltage at the single pair of DC-DC converter output terminals and a voltage at the input terminals of the two DC-DC converters are the same.

17. The inverter of claim 10, further comprising a capacitor coupled across the single pair of DC-DC converter output terminals.

18. An inverter, comprising:
a plurality of DC-DC converters, each of the DC-DC converters comprising a pair of input terminals configured to couple to a photovoltaic module, and a pair of output terminals coupled together in parallel to an intermediate circuit;

a DC-AC converter having a pair of input terminals coupled to the intermediate circuit, and having a pair of output terminals configured to couple to a grid; and a controller for controlling at least a first DC-DC converter of the plurality of DC-DC converters, wherein the controller is configured to deactivate a first DC-DC converter when a first voltage at the input terminals of the first DC-DC converter exceeds a peak voltage of the grid and the first voltage exceeds voltages at the input terminals of each other of the plurality of DC-DC converters.

19. The inverter of claim 18, wherein during deactivation the first voltage at the input terminals of the first DC-DC converter is substantially equal to a voltage of the intermediate circuit.

20. The inverter of claim 18, wherein during deactivation the inverter is configured to control a working point of a photovoltaic module coupled to the input terminals of the first DC-DC converter via the DC-AC converter.

21. The inverter of claim 18, wherein the controller is further configured to activate the deactivated first DC-DC converter when the first voltage differs from the peak voltage of the grid by less than a predetermined amount.

22. The inverter of claim 18, wherein the controller is further configured to deactivate a second DC-DC converter of the plurality of DC-DC converters, when the first DC-DC converter is deactivated, when a difference between the voltages at the input terminals of the first and the second DC-DC converters falls below a predetermined threshold.

23. The inverter of claim 22, wherein the controller is further configured to activate at least one of the first and second DC-DC converters when the input voltage of the at least one DC-DC converter differs by less than a predetermined amount from a peak voltage of the grid, when a power ratio between photovoltaic modules coupled to the first and second DC-DC converters is above a limit value and/or when a predetermined time has elapsed since one of the first and second DC-DC converters has been deactivated.

24. The inverter of claim 18, wherein the controller is further configured to deactivate a second DC-DC converter of the plurality of DC-DC converters, when the first DC-DC converter is deactivated, based on a comparison between a power loss from operating the second DC-DC converter and a power loss from operating photovoltaic modules coupled to the input terminals of the first and second DC-DC converters at a common working point.

25. The inverter of claim 18, further comprising an additional switch arranged to bridge at least one of a diode, a choke, and a semiconductor switch of the first DC-DC converter.

* * * * *